United States Patent Office 3,535,367
Patented Oct. 20, 1970

3,535,367
PROCESS FOR SYNTHESIS OF 4-HYDROXY-CYCLOHEXANECARBOXYLIC ACID AND DERIVATIVES THEREOF
Goro Inoue, Tokyo, Toshio Kato, Saitama Prefecture, and Noboru Ohshima, Tokyo, Japan, assignors to Asahi Kasei Kogyo Kabushiki Kaisha, Osaka, Japan
No Drawing. Filed Apr. 10, 1967, Ser. No. 639,251
Claims priority, application Japan, Apr. 21, 1966, 41/25,119
Int. Cl. C07c 61/08
U.S. Cl. 260—468          5 Claims

ABSTRACT OF THE DISCLOSURE

A process for producing 4-hydroxycyclohexanecarboxylic acid and its derivatives, for example, esters. In the process, a compound represented by the general formula:

wherein X is —$COOR_1$ whose $R_1$ is an alkyl radical, —CN or —$CONH_2$, for example, 4-cyclohexenecarbonitrile, 4-cyclohexenecarboxyamide or ethyl 4-cyclohexenecarboxylate, is made to react with sulfuric acid at a temperature between —20° C. and 100° C. and the product is then hydrolyzed under a condition employed in ordinary hydrolysis, i.e., in an acidic or alkaline environment.

---

The present invention relates to a process for producing 4-hydroxycyclohexanecarboxylic acid and derivatives thereof represented by the general Formula II:

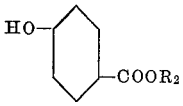

wherein $R_2$ represents a member selected from the group consisting of the hydrogen atom and the alkyl radicals, by reacting a compound represented by the general Formula I:

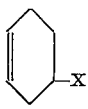

wherein X represents a member selected from the group consisting of —$COOR_1$ whose $R_1$ represents an alkyl radical, —CN and —$CONH_2$ with sulfuric acid and hydrolyzing the obtained product.

For the production of hydroxycyclohexanecarboxylic acid and carboxylic acid derivatives thereof, the method wherein the corresponding hydroxybenzoic acid or its carboxylic acid derivative is hydrogenated in the presence of a catalyst has heretofore been employed. However, this method is not suitable for the industrial production, because the starting material, hydroxybenzoic acid is costly and hard to be obtained.

We searched for a method for economically producing 4-hydroxycyclohexanecarboxylic acid and its derivatives which are useful in the production of polymers, and as the result, found that above-mentioned compounds could be produced very easily by hydrating a compound which is represented by the general Formula I and obtained industrially very easily, for example, by Diels-Alder reaction between butadiene and a compound of the general formula:

$$CH_2=CH—X$$

wherein the X represents the same in x. Thus, the present invention has come to be accomplished.

The details of the present invention are illustrated below.

The process of the present invention is divided, for convenience sake, into the two main stages. In the first stage, a compound represented by the general Formula I is made to react with sulfuric acid, and in the second stage, the obtained reaction product (which is considered to be a substance formed by partial addition of the sulfuric acid to the compound represented by the general Formula I) is hydrolyzed.

In the first stage, the reaction is carried out by mixing the starting material (which is a compound represented by the general Formula I) with sulfuric acid in the presence or absence of a solvent at a defined temperature. In this case, sulfuric acid of any concentration higher than 40% may be used, and the best result is obtained by the use of sulfuric acid of the concentration of more than 75%. The quantity of concentrated sulfuric acid may be more than 0.1 mole proportion, based upon the starting material used, and the use of from 0.4 to 5 moles is preferred. In the reaction of the first stage, a proper solvent which does not have an essential influence upon the reaction, for example, hexane, dioxane, nitromethane, acetic acid, propionic acid etc. may be used. The reaction temperature has not so great influence, and the preferred range of the temperature is from —20° C. to 100° C., the most preferred range being from —5° C. to 50° C. It is advantageous to use the reaction product in the second stage, only after removing the solvent or/and sulfuric acid, if needed, without isolation and purification.

In the second stage, the reaction product obtained by the reaction of the first stage is hydrolyzed. Any of the conditions which are generally employed in the hydrolysis of nitriles, carboxylic acid amides, carboxylic acid esters, sulfuric acid esters, etc., that is, the condition of hydrolysis in a strongly acidic, weakly acidic, weakly alkaline or strongly alkaline environment caused by sulfuric acid, hydrochloric acid, a sulfonic acid, an alkali carbonate or an alkali hydroxide may be employed.

However, the most advantageous method for carrying out the present invention is to use the sulfuric acid used in the first stage as such in the second stage as the catalyst for hydrolysis. In this case, the purpose of the second stage is effected by only heating the reaction mixture after the reaction of the first stage at a defined temperature for a required period, after addition of a proper amount of water, if needed. Therefore, the division of the first stage from the second stage is not essential and the process may be carried out continuously. Thus, it is a matter of course that all of the apparent hydration reactions of the compound (I) carried out under various conditions are within the scope of the present invention.

In the present invention, any of the methods employed generally for isolation and collection of carboxylic acids may be employed in order to isolate the 4-hydroxycyclohexanecarboxylic acid formed by the reaction of the first stage and the reaction of the subsequent second stage. Thus, extraction with a solvent under acidic condition, adsorption on an ion exchange resin and elution, and precipitation or crystallization in the form of a metal salt may be employed. Thus obtained crude 4-hydroxycyclohexanecarboxylic acid may be purified by the physical method such as recrystallization, reprecipitation or readsorption. However, distillation of 4-hydroxycyclohexanecarboxylic acid is generally impossible and it hardly crystallizes, making the purification difficult. Therefore, it is industrially more advantageous to esterify 4-hydroxycyclohexanecarboxylic acid by the usual method, according to the purpose, and to isolate the 4-hydroxycyclohexanecarboxylic acid ester by distillation, rather than to collect the compound in the form of the free acid.

The following examples illustrate the present invention without limiting its scope thereto.

EXAMPLE 1

To 10.7 g. of 4-cyclohexenecarbonitrile, there was added 2.6 g. of 94% sulfuric acid and the obtained mixture was stood for 5 hours, added with 50 ml. of 5 N-sodium hydroxide solution and heated for 4 hours on a water bath. After cooling, the reaction mixture was acidified by addition of 30% sulfuric acid and extracted with chloroform. After the chloroform layer was dried with sodium sulfate, the chloroform and 4-cyclohexenecarboxylic acid were distilled and recovered under reduced pressure. By recrystallizing the residue from a mixture of petroleum ether and ether, 4-hydroxycyclohexanecarboxylic acid having a melting point of 149° C. was obtained.

*Analysis.*—Calc'd for $C_7H_{12}O_3$ (percent): C, 58.31; H, 8.39. Found (percent): C, 58.01; H, 8.45.

EXAMPLE 2

To 10.7 g. of 4-cyclohexenecarbonitrile, there was added 8.3 g. of 88% sulfuric acid at 30° C. and the mixture was stood for a night. The viscous reaction mixture was heated under reflux for 4 hours after addition of 70 g. of water, cooled and then poured into iced water. The barium sulfate separated out by neutralization with barium hydroxide was removed and the filtrate was concentrated to dryness and then extracted with ethanol. By distilling the ethanol off from the extract, crude 4-hydroxycyclohexanecarboxylic acid was obtained. To this substance, there was added 22.0 ml. of ethanol and 14 g. of concentrated sulfuric acid, and the mixture was refluxed for 15 hours to cause esterification. The reaction mixture was poured into 10% sodium carbonate solution and the mixture was extracted four times by use of 200 ml. of ether. The ether was distilled off from the ether extract after drying and the residue was distilled under reduced pressure. Thus, 1.7 g. of the object 4-hydroxycyclohexanecarboxylic acid ethyl ester, B.P.$_{0.5}$ 80–83° C., was obtained after distillation out of 2.4 g. (15.5%) of 4-cyclohexenecarboxylic acid ethyl ester, B.P.$_{20}$ 81° C. (The yield was 81%, with regard to the recovered 4-cyclohexenecarboxylic acid.)

*Analysis.*—Calc'd for $C_9H_{14}O_2$ (percent): C, 62.8; H, 9.4. Found (percent): C, 62.56; H, 9.43.

EXAMPLE 3

To 10.7 g. of 4-cyclohexenecarbonitrile, there was added 5.6 ml. of 90% sulfuric acid slowly at 30–35° C. and the mixture was stood for a night. The obtained viscous reaction mixture was poured into 300 ml. of iced water and the pH of the mixture was adjusted to 7.0 by addition of an aqueous solution of sodium hydroxide. The mixture was then concentrated to dryness. The residue was extracted with 100 ml. of ethanol, while hot to remove the inorganic salt. By concentrating the ethanol extract to dryness, 11.2 g. of a white solid was obtained. To this substance, there was added 40 g. of 50% sulfuric acid and the mixture was heated for 4 hours under reflux to cause hydrolysis, cooled and then poured into 300 ml. of water. The mixture was added with barium hydroxide to remove the free sulfuric acid and the filtrate was concentrated to dryness. The residue was extracted with ethanol and the crude 4-hydroxycyclohexanecarboxylic acid was obtained by distilling the ethanol off from the extract. This substance was converted into the ethyl ester in the same manner as mentioned in Example 2 and the product was distilled. Thus, 10.8 g. of 4-hydroxycyclohexanecarboxylic acid ethyl ester, B.P.$_5$ 105° C. was obtained after distillation out of 3 g. (19.5%) of 4-cyclohexenecarboxylic acid ethyl ester, B.P.$_{20}$ 81–83° C. (The yield was 78%, with regard to the recovered 4-cyclohexenecarboxylic acid ethyl ester.) By heating a mixture of 1.2 g. of the obtained 4-hydroxycyclohexanecarboxylic acid ester, 1 ml. of hydrazine hydrate and 2.5 ml. of ethanol on an oil bath under reflux for 3 hours, white crystals were obtained. These crystals were recrystallized from water-alcohol to obtain 4-hydroxycyclohexanecarboxylic acid hydrazide, M.P. 171–172° C.

*Analysis.*—Calc'd for $C_7H_{14}N_2O_2$ (percent): C, 53.14; H, 8.92; N, 17.7. Found (percent): C, 53.08; H, 8.76; N, 17.93.

EXAMPLE 4

To 12.5 g. of 4-cyclohexenecarboxyamide, 5.0 g. of 100% sulfuric acid was added in such a manner that the temperature did not exceed 30° C. The mixture was stood for a night, added with 110 ml. of 5 N-sodium hydroxide solution with cooling, refluxed for 4 hours at a temperature higher than 95° C. on a water bath and then concentrated to dryness after neutralization with 50% sulfuric acid. The residue was extracted with 300 ml. of absolute methanol, while hot and the extract was heated for 15 hours under reflux after addition of 15 g. of concentrated sulfuric acid to cause esterification. By the similar subsequent treatment to that mentioned in Example 2, 7.8 g. of 4-hydroxycyclohexanecarboxylic acid methyl ester was obtained.

EXAMPLE 5

To 15.4 g. of 4-cyclohexenecarboxylic acid ethyl ester, 9.8 g. of 100% sulfuric acid was added dropwise and 7.2 g. of 4-hydroxycyclohexanecarboxylic acid ethyl ester was obtained by the similar subsequent treatment to that mentioned in Example 2.

What is claimed is:

1. A process for producing compounds represented by the formula:

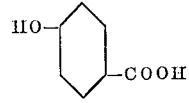

which comprises reacting a compound of the general formula:

wherein X represents a member selected from the group consisting of —CN, —CONH$_2$, and —COOR, wherein R$_1$ is an alkyl radical having 1–5 carbon atoms with sulfuric acid and hydrolyzing the product.

2. A process for producing compounds represented by the general formula:

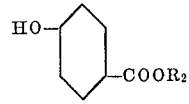

wherein R$_2$ represents a member selected from the group consisting of alkyl radicals having 1–5 carbon atoms which comprises reacting a compound represented by the general formula:

wherein X represents a member selected from the group consisting of —CN, —CONH$_2$ and —COOR$_1$ wherein $R_1$ is an alkyl radical having 1–5 carbon atoms, with sulfuric acid and hydrolyzing the product and finally esterifying the thus obtained free acid.

3. A process according to claim 1 wherein the reaction is effected at a temperature between −20° and 100° C.

4. A process according to claim 1 wherein the quantity of concentrated sulfuric acid is from 0.4 to 5 moles based on the starting material used.

5. A process according to claim 2 wherein $R_2$ is methyl radical or ethyl radical and X is —CN.

References Cited

Noller: Chem. of Organic Compounds, 2nd Ed., 1957.
Degering: Organic Nitrogen Compounds, Univ. Lithoprinters, 1950.

LORRAINE A. WEINBERGER, Primary Examiner

PAUL J. KILLOS, Assistant Examiner

U.S. Cl. X.R.

260—514